United States Patent [19]

Whitfield

[11] Patent Number: 5,209,306
[45] Date of Patent: May 11, 1993

[54] TURF AERATOR WITH IMPROVED BEARINGS FOR LATERAL TINE MOVEMENT

[76] Inventor: Carroll J. Whitfield, 1709 Slack Dr., Tifton, Ga. 31793

[21] Appl. No.: 863,808

[22] Filed: Apr. 6, 1992

[51] Int. Cl.⁵ .................................................. A01B 45/02
[52] U.S. Cl. ...................................... 172/21; 172/118; 172/97; 172/457; 384/571
[58] Field of Search .............. 172/21, 22, 97, 118, 172/457, 449; 384/157, 571, 619

[56] References Cited

U.S. PATENT DOCUMENTS

| | | | |
|---|---|---|---|
| 1,224,346 | 5/1917 | Wingquist | 384/571 |
| 1,840,552 | 1/1932 | Ackerman | 384/571 |
| 2,759,310 | 8/1956 | Newkirk | 172/449 X |
| 3,706,346 | 12/1972 | Vissers | 172/449 X |
| 4,202,415 | 5/1980 | Barlage | 172/118 X |
| 4,883,371 | 11/1989 | Matsumoto | 384/571 X |
| 5,029,652 | 7/1991 | Whitfield | 172/21 |

FOREIGN PATENT DOCUMENTS

| | | | |
|---|---|---|---|
| 366794 | 1/1939 | Italy | 172/118 |
| 1337124 | 11/1973 | United Kingdom | 172/97 |

Primary Examiner—Randolph A. Reese
Assistant Examiner—Jeffrey L. Thompson
Attorney, Agent, or Firm—Hopkins & Thomas

[57] ABSTRACT

An apparatus for aerating turf including a mounting frame (11) for mounting the apparatus to the hydraulic lift system (12) of a utility tractor. A trailer support frame (13) is pivotably mounted to the mounting frame (11) so as to enable the trailer support frame (13) to tilt toward and away from engagement with the turf. A plurality of rotary hoes (39) are supported within the trailer support frame (13) along a drive shaft (41). Each rotary hoe (39) has a double row tapered roller bearing assembly (53) mounted on the drive shaft (41) at an angle tilted from the longitudinal axis (70) of the drive shaft, causing the rotary hoe to wobble from side-to-side (B, B') in response to the rotation of the drive shaft.

7 Claims, 5 Drawing Sheets

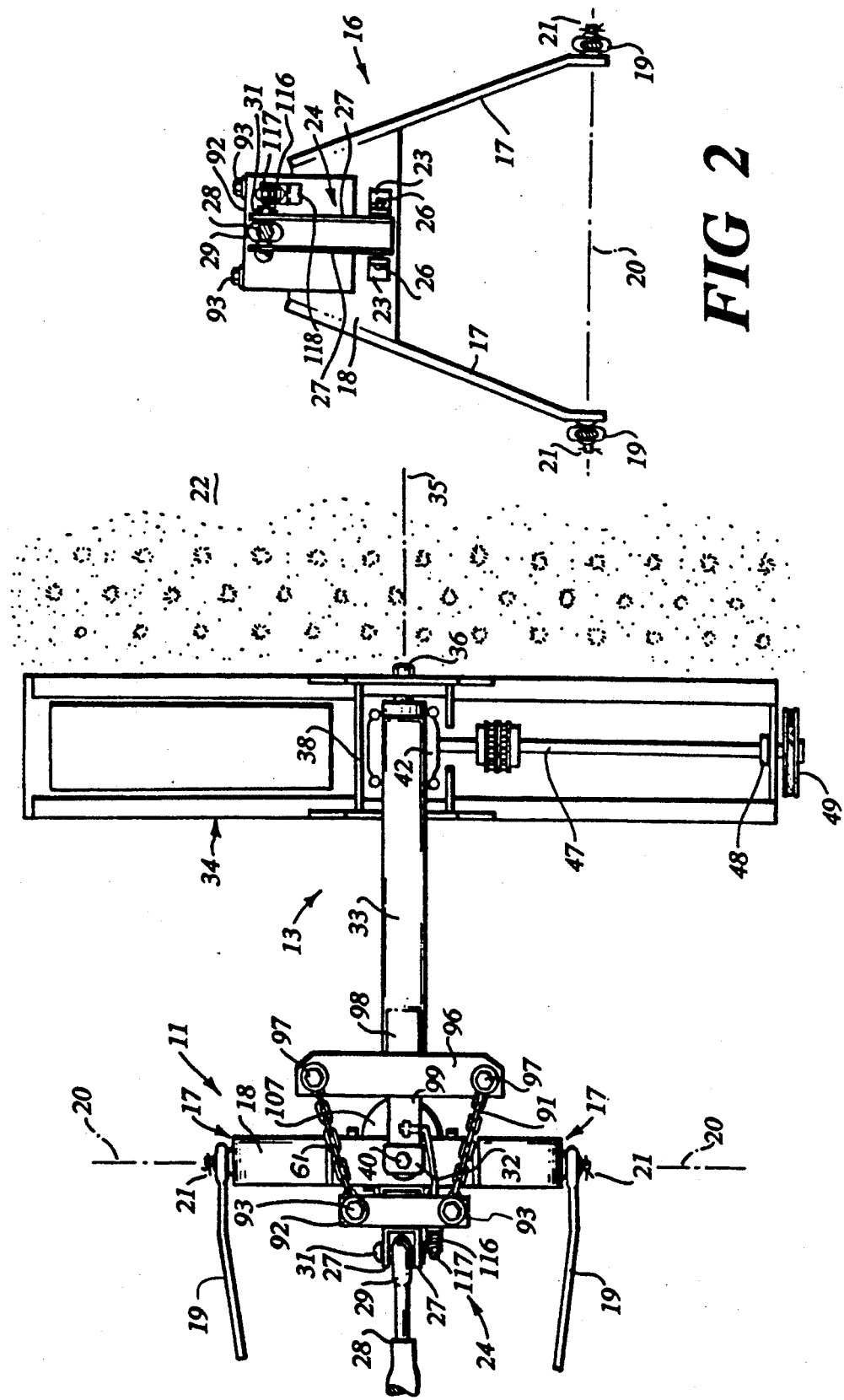

TURF AERATOR WITH IMPROVED BEARINGS FOR LATERAL TINE MOVEMENT

FIELD OF THE INVENTION

The present invention relates in general to a method and apparatus for aerating the roots of grass and other ground cover vegetation by forming a pattern of holes extending into the ground surface to the roots of the grass etc. so as to expose the root structure of the turf to air, moisture and nutrients in order to stimulate root growth. More particularly the invention relates to a driven shaft, rotary hoes mounted along the shaft, and a bearing assembly that causes the rotary hoes to wobble in response to the rotation of the driven shaft.

BACKGROUND OF THE INVENTION

In the treatment and care of turf such as grass or other ground covers of lawns, golf courses, softball fields, and the like, it is highly desirable to aerate the turf so as to enable air, moisture and nutrients to reach the roots of the grass, etc. The aeration of turf is generally performed by forming a pattern of holes in the turf. This tends to disturb the soil and roots beneath the surface of the ground cover and when moisture and fertilizers are applied to the turf, the root structure of the turf is able to directly absorb these nutrients and thereby the growth of the root structure is stimulated, making the turf healthier. Some of the prior art aerators typically have a plurality of coring tines which penetrate the soil and cut a generally cylindrical core or plug in the turf, and when the coring tines are removed from the turf they usually lift the core out of the ground, leaving a residue of cores of soil on the surface of the ground. The residue of cores of soil is undesirable on lawns and on playing fields such as golf courses and baseball fields where the condition of the surface of the turf is very important to the sports person. A type of core producing aerator is disclosed in U.S. Pat. No. 4,773,486.

As taught in my U.S. Pat. No. 5,029,652, a turf aerator has been developed which includes rotary hoes mounted about a laterally extending shaft which "walk" or rotate along the ground in response to forward movement of the aerator and which wobble when the shaft is rotated. This combination of movements causes the tines of the rotary hoes to form holes in the soil that are larger in lateral dimensions than the width of the tines, and the tines tend to penetrate the soil with less weight being required to force the tines into the soil than the previously known aerators. While the operation of my prior art aerator has proven satisfactory, the bearings which are required to create the wobbling of the rotary hoes tend to wear rapidly and become inoperative. This is because the ball bearings used in the prior art equipment are not capable of enduring the lateral forces encountered by the wobbling movements of the rotary hoes, especially when the tines are imbedded in dense soil and large lateral forces must be applied to the tines to push them laterally through the soil.

Accordingly it can be seen that it would be desirable to produce an apparatus which performs the function of aerating turf while significantly reducing compaction of the soil and without leaving cores of soil on the ground surface, and which forms openings in the surface of the turf and disturbs the soil to stimulate the growth of the root structure of the ground cover, and which includes a plurality of rotary hoes each having a bearing structure which is capable of enduring large and continual lateral wobbling forces as the tines of the rotary hoes walk through the soil and push the soil laterally.

SUMMARY OF THE INVENTION

Briefly described, the present invention comprises an apparatus for aerating grass turf and other ground covers by forming holes through the surface to the roots of the turf with the tines of rotary hoes, and moving the distal ends of the tines laterally while extending into the ground so as to loosen and otherwise disturb the soil at the level of the roots while causing a minimum change to the turf at the surface of the ground.

The turf aerator comprises a unit supported on the power arms of the hydraulic lift system of a utility tractor and held at the surface of the turf. The aerator is hitched to the rear of the tractor by a conventional three-point hitch which includes a power take-off drive shaft. The use of a three point hitch enables the aerator to be raised and lowered so as to selectively engage the ground surface and to follow the contour of the ground surface as the tractor moves over hills.

The turf aerator has a plurality of rotary hoes each of which includes a plurality of tine elements, and the rotary hoes are mounted on a common drive shaft of the framework of the trailer unit. The rotary hoes each include a bearing mounted to the drive shaft so that the rotary hoes freely rotate about the drive shaft. The bearings of each rotary hoe are mounted at an angle with respect to the longitudinal axis of the drive shaft so that when the drive shaft of the turf aerator is driven by the rotation of the power take-off of the tractor, the bearings of the rotary hoes revolve about the drive shaft and the revolving bearings cause the tine elements of the rotary hoes to vibrate or wobble from side to side.

In the preferred embodiment, the bearing assembly for each rotary hoe comprises double row tapered roller bearings on indirect mountings. The inner race of the bearing assembly is mounted on a pair of adapters that are positioned on the non-circular drive shaft, with the adapters forming a support surface for the bearing assembly that has an axis of rotation oriented at an angle of, for example, about 5 degrees to the axis of rotation of the drive shaft. Therefore, when the drive shaft rotates, the bearing assemblies and the rotary hoes mounted on the bearing assemblies wobble from side-to-side.

When the turf aerator is lowered into engagement with the ground by the hydraulic lift system of the tractor, the downwardly facing tines of the rotary hoes penetrate the turf. When the tractor is not moving and the power take-off of the tractor has been engaged, the drive shaft will rotate. The tines of the rotary hoes wobble from side to side in an elliptical pattern as the drive shaft is rotated, creating a burrowing motion of those tines engaging the turf. The tines move back and forth in the soil so as to disturb the soil as the tines progressively penetrate the soil.

When the tractor moves either forwardly or rearwardly the tine elements which are in engagement with the turf cause the rotary hoes to rotate about the drive shaft with the rotary hoes tending to "walk" in the turf. As the rotary hoes walk in the turf the tines which are initially embedded within the soil are raised out of the soil as other tines are rotated downwardly into engagement with and penetrate the turf. If the tractor is moved forwardly with the power take-off rotating the drive shaft of the turf aerator, thus causing tine elements to wobble from side-to-side, the tine elements will vibrate and move laterally and burrow into and out of the soil as they walk with the movement of the tractor.

If the power take-off of the tractor is not engaged and thus the drive shaft is not rotating, the rotary hoes will not wobble but will freely rotate about the stationary drive shaft. Consequently, the rotary hoes will simply walk in the turf with the movement of the tractor, forming holes in the turf, but usually with less soil penetration.

Therefore, it is an object of this invention to provide an improved apparatus for aerating turf, to expose the root structure of the turf to air, water and nutrients to stimulate root growth, while causing a minimum of compaction of the soil with increased penetration and lateral disruption of the ground surface.

Another object of this invention is to provide improved, durable bearing assemblies for the rotary hoes of a turf aerator so that the tines of the hoes walk through the turf and wobble from side to side so as to burrow into the turf and disturb the root structure of the turf with minimal damage to the surface of the turf.

Another object of this invention is to provide an improved, long lasting trailer unit turf aerator to be supported by the hydraulic lift system of a tractor and hitched to the rear of the tractor to be pivotable about vertical and longitudinal axes at the rear of the tractor so as to follow the contours of the turf.

Another object of the invention is to provide an agricultural implement that includes rotary elements that engage and till the soil, and an improved bearing assembly for each rotary element that provides lateral motion to the rotary element for laterally displacing soil as the implement moves in a forward direction.

Other objects, features and advantages of the invention will become apparent upon reading the following specification, when taken in conjunction with the accompanying drawings.

BRIEF DESCRIPTION OF THE DRAWINGS

FIG. 2 is an end view of the hitch A-frame which is attached to the hydraulic lift system of the tractor.

FIG. 3 is a plan view of the turf aerator illustrating the three point configuration of the hitch which supports the trailer unit on the hydraulic arms of the lift system of the tractor.

DESCRIPTION OF THE PREFERRED EMBODIMENT

Figure 1:
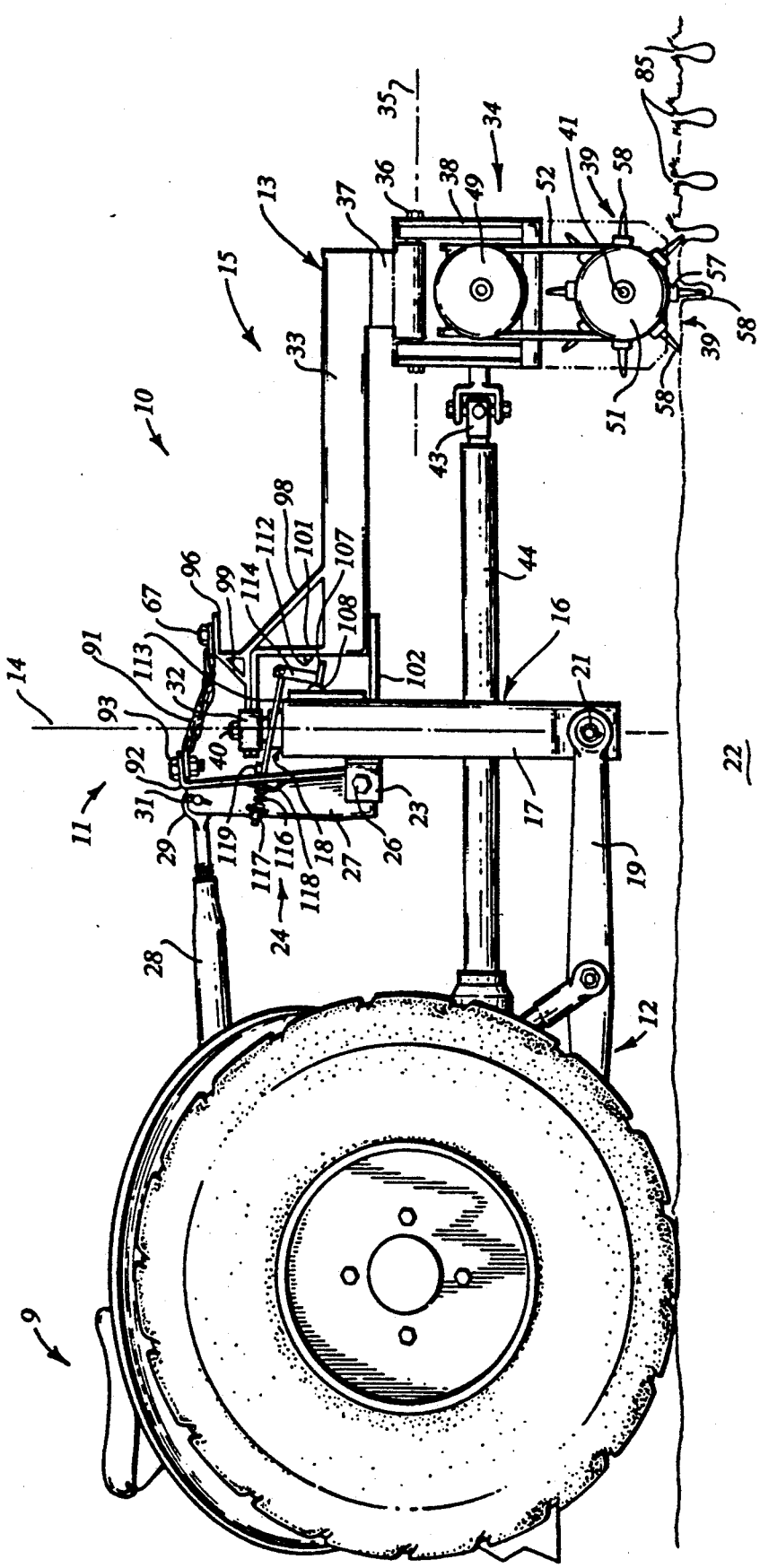
FIG. 1 is a side elevational view of the turf aerator which is a trailer unit hitched to the hydraulic lift system of a tractor.

Referring now in more detail to the drawings in which like numerals indicate like parts throughout the several views, FIG. 1 illustrates the turf aerator 10 for use with a conventional tractor, preferably a mid-size utility tractor 9 (partially shown) of the type commonly used for lawn care. The turf aerator 10 comprises a trailer unit 15 having a mounting support frame 11 mounted to the hydraulic lift system 12 at the rear of the tractor 9, and a trailer frame 13 attached to the mounting support frame 11 so as to be pivotable about an upwardly extending pivot axis 14. Mounting support frame 11 is mounted to the hydraulic lift system 12 by a hitch A-frame 16 (FIG. 2) which has a pair of A-frame side arms 17 that diverge downwardly and away from a horizontal cross brace 18. The A-frame side arms 17 and cross brace 18 form the hitch A-frame 16.

Each A-frame side arm 17 of hitch A-frame 16 is pivotably attached at its lower end to one of the power arms 19 (FIG. 1) of the tractor's hydraulic lift system 12 by a hinge pin 21. The power arms 19 and the upper control arm 28 of the hydraulic lift system 12 of the tractor 9 support the turf aerator 10, holding the turf aerator 10 above the surface of the turf 22, and the raising and lowering of the arms 19 and 28 raise and lower the turf aerator with respect to the ground surface.

Hinge pins 21 at the lower ends of A-frame side arms 17 enable the hitch A-frame 16 and the trailer frame 13 of the turf aerator 10 to tilt vertically about the lateral axis 20 formed by the hinge pins 21 to follow the contour of the turf 22 and to be raised away from its lowered position out of engagement with the turf 22 for transport to another work site.

Support brackets 23 is affixed along the lower edge of the front surface of cross brace 18 of hitch A-frame 16 facing forwardly toward the tractor. The support brackets 23 are welded to the front surface of cross brace 18 and are attached to the lower end of tiltable support link 24 by pin 26. The support brackets 23 straddle the outside surfaces of the horizontally extending side walls 27 of the tiltable support link 24. Pin 26 is inserted through aligned openings in each support bracket 23 and the side wall 27 of the tiltable support link 24 adjacent each support bracket 23 so as to pivotably affix hitch A-frame 16 and its cross-brace 18 to the tiltable support link 24.

As shown in FIG. 1, the stabilizing arm 28 of the hydraulic lift system 12 of the tractor is connected at its distal end to side walls 27 of tiltable support link 24. The connecting eye bolt 29 of the stabilizing arm 28 is positioned between the side walls 27 of the tiltable support link 24, at the upper end of the tiltable support link 24, and is secured to the upper end of the tiltable support link 24 by a pin 31. Pin 31 is inserted through both side walls 27 and the center of the eyebolt 29 to pivotably secure the tiltable support link 24 to the stabilizing arm 28.

Figure 4:
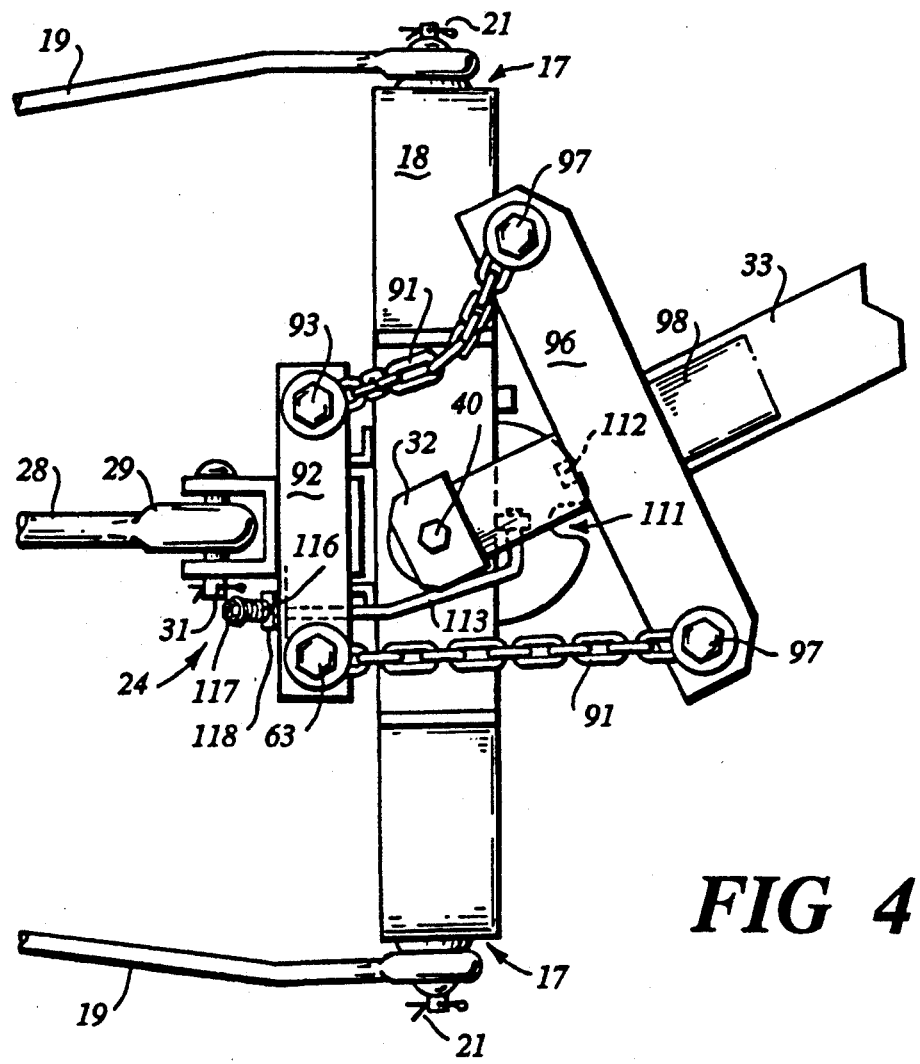
FIG. 4 is a plan view of the turf aerator similar to FIG. 3, but illustrating the turning motion of the trailer support frame with respect to the mounting support frame as limited by the support chains.

As illustrated in FIGS. 1, 3 and 4, a vertical pivot joint 32 is formed through cross brace 18 of hitch A-frame 16, by the pivot pin 40 extending downwardly through pivot joint 32, through horizontal cross-brace 18 of the hitch A-frame 16 and into horizontal brace 102 (FIG. 1), approximately in the center of cross brace 18 and forms the upwardly extending pivot axis 14 (FIG. 1). The trailer frame 13 of the turf aerator 10 is attached to the mounting support frame 11 by the vertical pivot joint 32, and swings about upwardly extending pivot axis 14 so as to trail behind the tractor as the tractor advances through a turn. Other type trailer unit gardening implements can be mounted to and trail behind the mounting support frame.

As illustrated in FIGS. 1 and 3 the trailer frame 13 comprises an elongate carriage support beam 33. One end of the carriage support beam 33 is attached to the mounting support frame 11, while the opposite end of the carriage support beam 33 pivotally supports a rectangularly shaped rotary hoe carriage 34 on a dowel or pin 36. The dowel 36 enables the rotary hoe carriage 34 to tilt about a longitudinal axis 35, thus enabling the turf aerator to be used to aerate turf 22 as the tractor moves across hills and sloped terrain during which the tractor tilts with respect to the trailer frame. Spacer block 37 is mounted to the lower distal end of support beam 33, and mounting bracket 38 is attached to the upper surface of rotary hoe carriage 34 (FIG. 3). Dowel 36 pivotally connects the rotary hoe carriage 34 to carriage support beam 33 about longitudinal axis 35.

The rotary hoe carriage 34 houses the rotary hoes 39 of the turf aerator 10, and the rotary hoes 39 are each supported on a non-circular drive shaft 41 of the turf aerator 10. A gear box 42 (FIG. 3) is mounted to the top surface of the rotary hoe carriage 34, between the upwardly extending side surfaces of mounting bracket 38. Power take-off shaft 44 of the tractor extends rearwardly of the tractor and its distal end is operatively connected in driving relationship of the gears in the gear box 42 by universal joint 43.

As illustrated in FIG. 3, jack shaft 47 is connected at one of its ends to gear box 42 and extends laterally toward bearing 48 at the side of the rotary hoe carriage 34, terminating at a sheave 49 (FIG. 3), which is affixed to the end of the jack shaft 47.

As illustrated in FIG. 1, a second sheave 51 is rotatably mounted to the end of drive shaft 41 and is positioned below and in the same plane as sheave 49. A drive belt 52 surrounds both sheaves 49 and 51 in frictional contact with each sheave so as to cause the lower sheave 51 and drive shaft 41 to be rotated in response to the rotation of upper sheave 49. As FIG. 5 illustrates, the lower sheave 51 is mounted to one end of the drive shaft 41, which is non-circular in cross section, upon which the rotary hoes 39 of the turf aerator 10 are supported.

Figure 5:
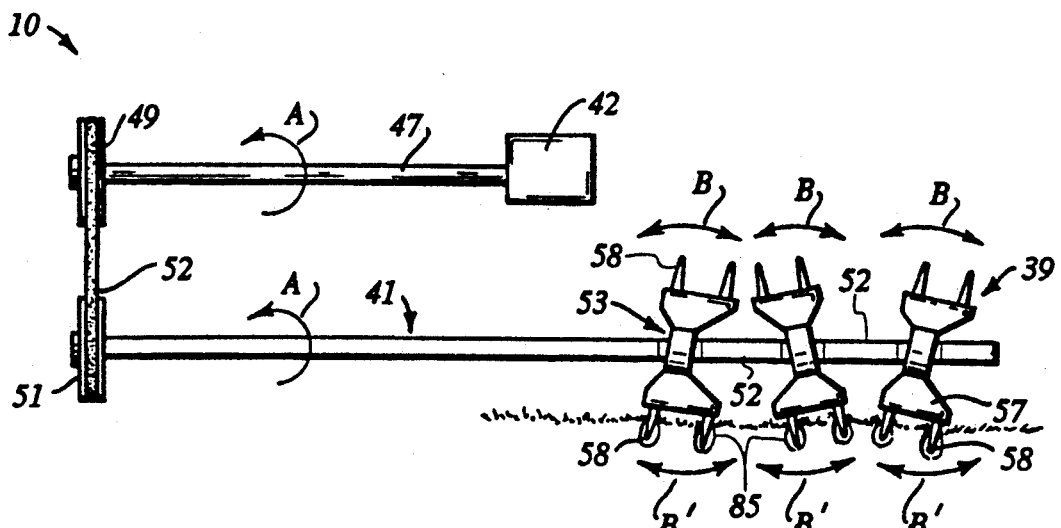
FIG. 5 is a schematic illustration of the side to side wobbling motion of some of the rotary hoes in response to the rotation of the drive shaft of the turf aerator.
Figure 6:
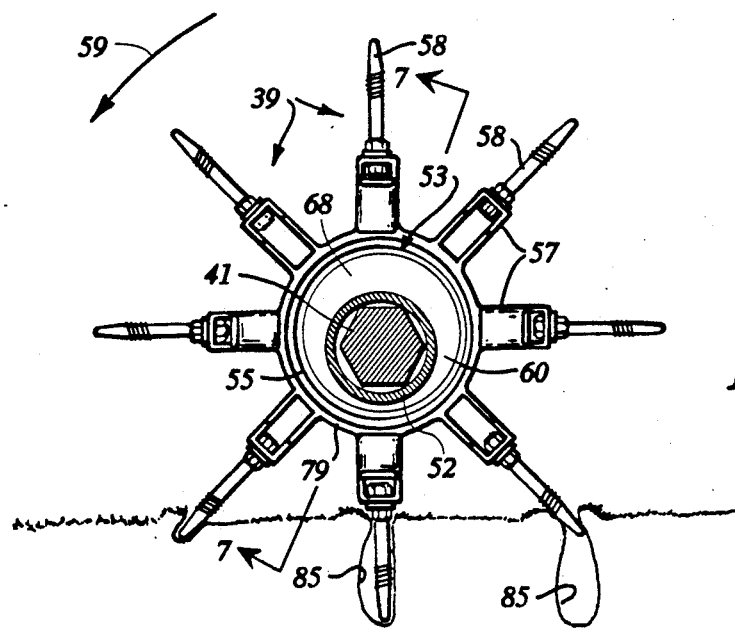
FIG. 6 is a side elevational view of a rotary hoe mounted on the drive shaft of the turf aerator, showing the drive shaft and spacer tube in cross section, and showing the forward "walking" motion of the rotary hoes.

A plurality of rotary hoes 39 are mounted on drive shaft 41, with the rotary hoes being spaced along the drive shaft by spacer tubes 52 (FIGS. 5-8). Each rotary hoe includes radially extending pairs of tines 58 (FIGS. 5 and 6) mounted on tine holding blocks 57. The arrangement is such that when the rotary hoes 39 are pulled along the turf, the hoes rotate about the drive shaft 41 in the direction as indicated by arrow 59 (FIG. 6).

Figure 7:
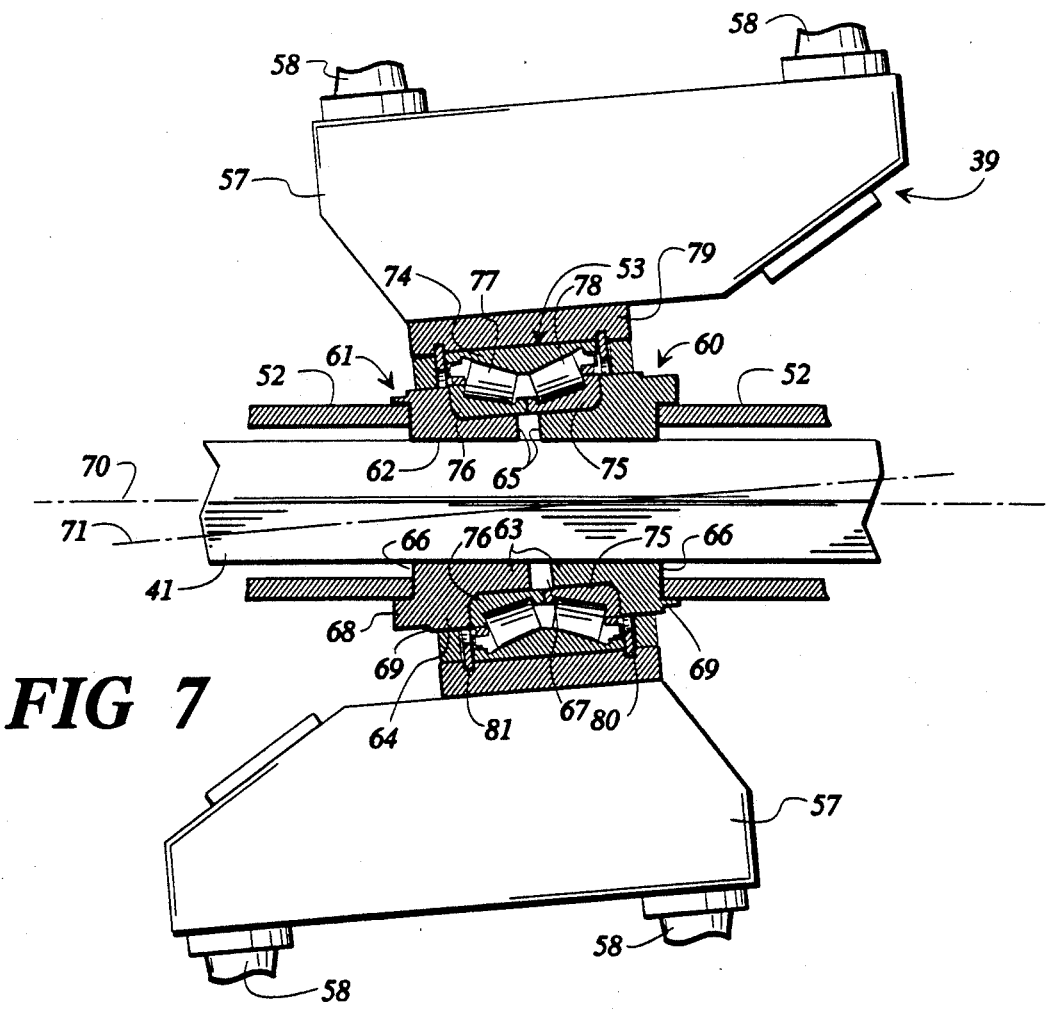
FIG. 7 is a cross sectional view of a rotary hoe of FIG. 6, taken along 7—7 of FIG. 6, showing how the adapters hold the roller bearing assembly and rotary hoe tilted with respect to the drive shaft.
Figure 8:
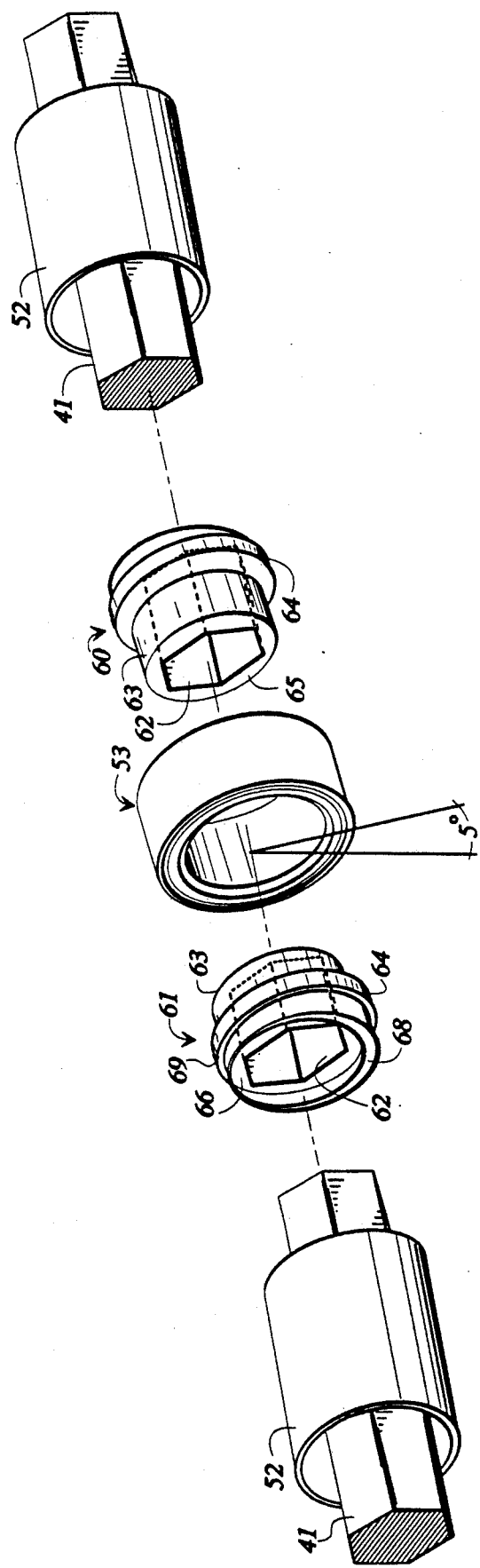
FIG. 8 is an expanded view of the drive shaft, spacer tubes, adapters and bearing assembly.

As illustrated in FIGS. 5, 7 and 8, the bearing assembly 53 is held in place by adapters 60 and 61 which are identical in size and shape. Each adapter includes a hexagonally shaped central opening 62 which is slidably but nonrotatably mounted along hexagonal drive shaft 41, a small diameter internal bearing support sleeve 63, a large diameter bearing retainer flange 64, an inner wall surface 65, an outer wall surface 66, sleeve retainer flange 68 and mounting shoulder 69.

Central opening 62, outer wall surface 66 and the inside surface of sleeve retainer flange 68 of the adapters are all coaxial with the longitudinal centerline 70 of the drive shaft 41, and the axial extending face of outer wall 66 is perpendicular to the centerline 70 of the drive shaft. However, the outer circumferential surface of the small diameter internal bearing support sleeve 63, the outer circumference of the large diameter bearing retainer flange 64 and the outer circumferential surface of sleeve retainer flange 68 are canted at 5 degrees with respect to the longitudinal axis 70 of the drive shaft 41, and are coaxial with respect to centerline 71. Also, the faces of inner wall 65 and the opposed faces of the large diameter bearing retainer flange 64 are perpendicular to the centerline 71.

As illustrated in FIG. 7, the spacer tubes 52 abut the outer wall surfaces 66 of the adapters while being retained against the adapters by sleeve retainer flanges 68. Thus, the adapters 60, 61 are turned with respect to each other about the longitudinal axis 70 of the drive shaft 41 before being nonrotatably mounted on the drive shaft so that they are diametrically out of phase and form coextensive bearing surfaces on the outer circumferences of the small diameter internal bearing support sleeves 63. This is a surface that supports the bearing assembly 53. Further, a gap 67 is maintained between inner well surfaces 65 of the adapters.

Bearing assembly 53 includes a double row tapered roller bearing assembly which includes an outer annular cup 74, a pair of inner annular cones 75 and 76, and a pair of rows or "rings" of tapered rollers 77 and 78, with the ring of rollers 77 positioned on and supported by cone 76 and the ring of rollers 78 being positioned on and supported by cone 75. A typical two row tapered roller bearing assembly such as illustrated at 53 in FIG. 6 is available from Timken Company, Canton, Ohio, part number 90UA1. It will be noted that the tapered rollers of rings 77 and 78 have their smaller diameter ends facing each other so as to receive lateral forces from the outer cup 74 without displacement of the tapered rollers from between the outer annular cup 74 and inner annular cones 75 and 76.

Each rotary hoe 39 includes a rotor hub 79, and the holding blocks 57 are mounted to and spaced at circumferential intervals about the rotor hub 79 and protrude radially therefrom. A pair of rectilinear replaceable solid core teeth or tines 58 are mounted to each holding block 57 and protrude further radially outwardly from the rotor hub 79. The rotor hub 79 has internally facing snap ring grooves (FIG. 7) which receive snap rings 80 and 81 that straddle bearing assembly 53.

As illustrated in FIGS. 3 and 4, connecting chains 91 are attached at one end to an end of a horizontal cross bar 92 which extends laterally across the length of the turf aerator 10 and which is mounted to the upper end of tiltable support link 24. The chains 91 each are held in place by a bolt 93 which extends downwardly through the cross bar 92. The chains 91 extend divergently (FIG. 3) from the cross bar 92 to the upper surface of a horizontal stabilizing bar 96 which is rigidly mounted to and moves with trailer unit 15, where each chain 91 is affixed to the upper surface of stabilizing bar 96 by bolts 97. The stabilizing bar 96 is supported above the upper surface of the elongated carriage support beam 33 of the trailer support frame 13 (FIG. 1) by an angled support strut or brace 98 which is welded to the upper surface of carriage support beam 33 and to the lower surface of stabilizing bar 96.

An angled support strap 99, welded at one end to the lower surface of stabilizing bar 96, attaches the stabilizing bar 96 to the upper surface of a support bar 101. Support bar 101 has a substantially L-shaped configuration and extends rearwardly and downwardly from the upper end portion of the vertical pivot joint 32. The support bar 101 is pivotably attached at its upper end to the upper surface of cross brace 18 by pivot pin 40 of the vertical pivot joint 32, and is fixedly attached at its lower end to an end of carriage support beam 33. A horizontal brace 102, welded to the lower surface of carriage support beam 33, is pivotally connected to the lower end (not shown) of pivot pin 40 of vertical pivot joint 32 so as to pivot about vertical pivot axis 14 at the lower surface of the cross brace 18. Thus, the carriage support beam 33 of trailer frame 13 is pivotably connected by vertical pivot joint 32 to the mounting frame 11.

The chains 91 and the vertical pivot joint 32 form a swing linkage connecting the trailer frame 13 to the mounting frame 11 to enable the trailer frame 13 to pivot or swing about the rear of the tractor 9, upwardly about lateral pivot axis 20 and laterally about upwardly extending pivot axis 14. Lock plate 107 is hingedly mounted to the rearwardly facing surface of crossbrace 18 by hinge 108. Lock plate 107 has a locking notch 111 (FIG. 4) formed approximately in the center of its rearmost edge portion. Locking protrusion 112 (FIG. 1) protrudes from the downwardly extending portion of the L-shaped support bar 101 and is received within locking notch 111 (FIG. 4) when lock plate 107 is in its horizontal altitude. The engagement of locking protrusion 112 by the locking notch 111 acts as a locking mechanism to resist the tendency of the turf aerator 10 (FIG. 1) to swing freely about the rear of the tractor 9 when in its fully raised position for transport to another worksite.

As illustrated in FIG. 1, a lock plate linkage 113 is attached to a side surface of lock plate 107 by a connecting bar 114. The connecting bar 114 is welded at one end to a side surface of lock plate 107 and is pivotably connected to lock plate linkage 113 at its other end. Lock plate linkage 113 extends in a "dog-leg" configuration (FIGS. 3 & 4) around vertical pivot joint 32, and through an opening formed within the rear surface of tiltable support link 24, adjacent the side walls 27 of tiltable support link 24. A spring 116 is placed about the end of lock plate linkage 113 between a lock nut 117, mounted to the end of lock plate linkage 113, and an offset bracket 118 which abuts the forward most side surface of tiltable support link 24, as shown in FIG. 1. A stop tab 119 is welded to the lock plate linkage 113 on the opposite side of tiltable support link 24 from the offset bar 118 and spring 116. The stop tab 119 causes lock plate linkage 113 to be moved rearwardly as the lower portion of the tiltable support link 24 is moved rearwardly with the lowering of the turf aerator 10 toward the turf 22 to thus tilt lock plate 107 downwardly, thereby disengaging locking notch 111 from locking protrusion 112. When the turf aerator 10 is raised away from engagement with the turf 22, the lock plate linkage 113 is pulled forwardly as the tiltable support link 24 is tilted forwardly, thereby raising connecting bar 114 which in turn tilts lock plate 107 upwardly to thus lift locking notch 111 (FIG. 4) into engagement with locking protrusion 112 (FIG. 1) to lock the trailer frame 13 of the turf aerator 10 in aligned position behind the tractor for transport.

OPERATION

As illustrated in FIG. 1, the turf aerator 10 is hitched to the hydraulic lift system 12 of a conventional utility tractor 9 and is initially lifted away from the ground surface, with its tines 58 held out of engagement with the turf 22. Before aeration is begun, the operator tilts the turf aerator 10 downwardly toward the turf 22 by lowering the power arms 19 of the hydraulic lift system 12 of the tractor. The turf aerator 10 is positioned with the downwardly facing tines 58 of the rotary hoes 39 penetrating the turf 22 as shown in FIG. 1. Usually at least some of the weight of the turf aerator 10 remains supported upon the power arms 19 of the hydraulic lift system 12 and not completely upon the tines 58 of the rotary hoes 39 which are in engagement with the turf 22.

At the start of an aerating operation, the operator of the tractor engages the power takeoff shaft 44 of the tractor, causing the power takeoff shaft 44 to rotate. The gearing mechanism of the gear box 42 causes the jack shaft 47 to rotate in response to the rotation of the power takeoff 44. As the jack shaft 47 rotates (FIG. 3), the upper sheave 49, which is mounted to one end of the jack shaft 47, is also rotated. As the upper sheave 49 is rotated, it pulls the drive belt 52 about its circumference, causing the lower sheave 51 to rotate, and thus the hexagonal drive shaft 41 to which the lower sheave 51 is attached is caused to rotate in the direction of arrow A (FIG. 5). Thus, the rotational speed of the drive shaft 41 is directly related to the rotation of the power takeoff 44 of the tractor. Accordingly, the greater the revolutions per minute (rpm) of the power takeoff 44, the faster the drive shaft 41 is rotated.

As the drive shaft 41 rotates, the eccentric mountings of the bearings 53 on the drive shaft 41 impart a revolving side-to-side wobbling motion to the rotary tine elements 58 as shown by arrows B and B, of FIG. 5. Thus, as the drive shaft 41 rotates, the rotary hoes 39 wobble or vibrate on the drive shaft 41. The faster the rotation of the drive shaft 44, the faster the wobbling action of the rotary hoes 39. When the turf aerator 10 is lowered toward the turf 22, the tines 58 of the rotary hoes 39 engage and penetrate the turf 22. The vibration of the rotary hoes 39 causes the tines 58 to burrow into the turf 22 as the tines 58 engage the turf 22 so as to form aeration holes in the turf 22 without causing compaction.

The rate at which the tines 58 penetrate the turf 22 is a function of the speed of the side-to-side movements of the tines 58 and thus the rate of penetration of the tines 58 can be regulated by controlling the rpm's of the power takeoff 44 of the tractor which controls the speed of rotation of the drive shaft 41. In general, for most uses, the speed of the drive shaft 41 should be maintained at between 600 and 700 rpm. If greater or more rapid depth of penetration is required, the speed of rotation of the drive shaft 41 can be increased to increase the agitation of the rotary hoes 39. The increased agitation of the rotary hoes 39 causes the tines 58 to burrow into the turf 22 at a faster rate.

When the drive mechanism of the tractor is engaged and the tractor begins to move forwardly or rearwardly over the surface of the turf 22, the rotary hoes 39 will tend to "walk" in the turf 22 as illustrated in FIG. 6. Thus, the rotary hoes 39 will be freely rotated about the drive shaft 41 as the tractor moves forwardly, so as to rotate into and out of engagement with the turf 22, to thereby aerate the turf 22. If the power takeoff 44 of the tractor is also engaged, the tines 58 of the rotary hoes 39 will vibrate from side to side, burrowing into the turf as they walk forward to further aerate the turf 22. If the power takeoff shaft 44 is not engaged, the rotary hoes 39 will simply walk forward in the turf 22 in a similar manner to conventional aerators.

As illustrated in FIG. 6, the tines 58 initially penetrate the turf 22 at an angle. As the rotary hoes 39 walk forward, the tines 58 penetrate into the turf 22 in a downwardly arcing motion until the tines 58 are fully extended in a vertical alignment in the soil. At this point, the tines 58 begin to move in an upward arc toward the surface of the turf 22 with the continued walking motion to the rotary hoes 39 over the turf surface. As a result of the elliptical movement of the tines 58 into and out of engagement with the turf 22, a tear-shaped aeration hole 85 is formed in the turf 22. Simultaneously, the side-to-side wobbling motion of the tines 58 causes the tines to enlarge the size of the aeration hole 85 in the direction normal to the rotational movement of the tines 58. The resultant aeration hole 85 is a tear-shaped hole having a relatively small opening in the turf surface, while the portion of the aeration hole 85 below the turf surface usually is wider than the breadth of the tines 58.

Upon the completion of a turf aerating operation, the operator deactivates the power takeoff 44 of the tractor and raises the power arms 19 (FIG. 1) of the tractor's hydraulic lift 12 system so as to lift the turf aerator 10, to remove the tines 58 of the rotary hoes 39 from engagement with the turf 22. At first, the weight of the trailer unit 15 causes the trailer frame 13 to remain supported on the ground as the trailer frame and hitch A-frame 16 pivot clockwise (FIG. 1) about lateral axis 20 (FIG. 3) of pivot pins 21 and as the hitch A-frame is lifted away from the ground. In the meantime, the tiltable support link 24 tilts in a counter clockwise direction about both its upper and lower ends, increasing the distance between the horizontal cross bar 92 and the horizontal stabilizing bar 96, causing the chains 91 to become taut. After the chains are stretched, further upward movement of the power arms 19 of the tractor 9 results in a corresponding lifting of the trailer unit 15. If the trailer frame 13 is angled with respect to the mounting frame 11 (FIG. 4) when the trailer unit 15 is being lifted from the ground, as when the tractor has moved through a turn, one of the chains 91 will become taut before the other chain, causing the trailer frame 13 to swing back toward longitudinal alignment behind the mounting frame 11 until the other chain becomes taut. Thus, the chains 91 act as a limiting means for limiting the downward tilting motion of the trailer frame 13 and as a centering means to perform the function of centering the trailer frame 13 behind the tractor in position for transport to another site.

As the turf aerator is lifted and tiltable support link 24 tilts forwardly, the forwardly facing side surface of the tiltable support link 24 moves the offset bracket 118 forwardly. As offset bracket 118 is urged forwardly, it compresses spring 116 against locknut 117, thereby causing lock plate linkage 113 to be pulled forwardly. As lock plate linkage 83 moves forwardly, it tilts connecting bar 114 and lock plate 107 about their hinge 108, raising the lock plate 107 toward a horizontal altitude so that the locking notch 111 will be located at a level to receive the locking protrusion 112. If the trailer frame 13 is not properly centered behind the tractor, lock plate 107 is biased by spring 116 against the lower edge of locking protrusion 112, and locking protrusion 112 slides along the upper edge of the locking plate as the chains tighten and urge the trailer frame 13 about the rear of the tractor toward a centered position. As the trailer frame 13 is centered, locking notch 111 becomes aligned with locking protrusion 112 enabling lock plate 107 to tilt further upwardly in response to the bias of spring 116 so that locking protrusion 112 is engaged within locking notch 111. The engagement of the locking protrusion 112 within this locking notch 111 functions as a locking means to lock the trailer frame 13 in alignment with the mounting frame 11 to the prevent the turf aerator 10 from swinging freely about the rear of the tractor as it is transported to another job site.

While a specific trailer unit 15 has been disclosed as being mounted in trailing or locked relationship behind the mounting support frame 11, other types of trailer unit tillage or landscaping implements can be mounted behind the mounting support frame, if desired. Further, while rotary hoes have been specifically described, the term "rotary hoes" is to be construed as including other types of rotary soil tillage implements, such as discs and spiders. Moreover while this invention has been described in detail, it should be understood that the described embodiment merely illustrates the preferred form of the invention and other variations or modifications may be made thereto without departing from the spirit and scope of the invention as set forth in the following claims.

I claim:

1. A turf aerator for penetrating and loosening soil adjacent the surface of the ground comprising a frame for mounting to a tractor and movable in a forward direction, a drive shaft supported by said frame extending laterally of said forward direction and rotatable about its longitudinal axis, a plurality of rotary hoes mounted on said drive shaft and freely rotatable about said drive shaft, each of said rotary hoes including a bearing assembling surrounding said drive shaft, and a plurality of tines extending radially outwardly from said bearing assembly for penetrating the soil over which said drive shaft is moved by the frame and for rotating about said drive shaft in response to movement of said rotary hoes along the ground surface, drive means for rotating said drive shaft independently of the rotation of said rotary hoes about said drive shaft, the improvement therein comprising said bearing assemblies each comprising a two row roller bearing assembly, a pair of adapters surrounding said drive shaft and extending from opposite sides of each roller bearing assembly between said drive shaft and said roller bearing assembly, said pair of adapters forming coextensive surfaces supporting the two row roller bearing assembly at an axis of rotation which is canted with respect to the axis of rotation of said drive shaft, with the adapters constructed and arranged to hold the roller bearing assembly in an attitude having an axis of rotation for said rotary hoe angled with respect to the longitudinal axis of said drive shaft, so that when the drive shaft is rotated, the rotary hoes wobble and the tines of the rotary hoes move in the soil.

2. The turf aerator of claim 1 and wherein the roller bearing assembly comprises two rings of tapered rollers, with the smaller ends of each tapered roller of each ring positioned adjacent the smaller ends of the rollers of the other ring.

3. The turf aerator of claim 1 and wherein said two row roller bearing assembly comprises rows of tapered rollers positioned in an indirect mounting arrangement with the smaller ends of the tapered rollers positioned adjacent the tapered rollers of the other row and the axes of rotation of each tapered roller extending from the smaller end of each roller toward the longitudinal axis of said drive shaft.

4. A turf aerator of the type supported on and carried by the power arms of the hydraulic system of a utility tractor and powered by the power take-off of the tractor, said aerator comprising:

a frame;

a support means attached to said frame for connection to the power arms of the hydraulic system of the tractor;

a drive shaft mounted within said frame;

a plurality of rotary hoes freely rotatable on said drive shaft for engagement with and rotation on the turf below said frame;

a drive means for connection to the power take-off of the tractor and connected to said drive shaft for rotating said drive shaft in response to the rotation of the power take-off of the tractor;

each of said rotary hoes including a two row tapered roller bearing assembly rotatably mounting the rotary hoe to the drive shaft, a pair of adapter means mounted about said drive shaft and spaced from each other along the length of the drive shaft and positioned between the drive shaft and each roller bearing assembly for forming coextensive surfaces canted with respect to the drive shaft for tilting the roller bearing assembly and its rotary hoe with respect to said drive shaft;

so that when the drive shaft is rotated with the rotation of the power take-off of the tractor, each rotary hoe is vibrated so as to disturb the turf engaged by the rotary hoe.

5. An agricultural implement comprising a drive shaft having a longitudinal axis, means for rotating said drive shaft about its longitudinal axis, a plurality of rotary hoes mounted at spaced intervals along the length of said drive shaft, each of said rotary hoes including a two row roller bearing assembly mounting the rotary hoe to the drive shaft and adapter means orienting the axis of rotation of the roller bearing assembly and its rotary hoe at an angle canted with respect to the longitudinal axis of said drive shaft, each said adapter means comprising a pair of adapters mounted about said drive shaft and spaced from each other along the length of said drive shaft, said pair of adapters forming coextensive surfaces supporting the two row roller bearing assembly at an axis of rotation which is canted with respect to the axis of rotation of said drive shaft, so that when the drive shaft is lowered toward the ground surface and the rotary hoes engage the ground and the drive shaft is rotated about its longitudinal axis the rotary hoes wobble and move the soil.

6. The agricultural implement of claim 5 and wherein said rotary hoes each comprise a plurality of radially extending tines which engage and walk through the ground in response to movement of the drive shaft over the ground surface.

7. The agricultural implement of claim 5 and wherein said two row roller bearing assembly comprises two side-by-side coaxial rings of tapered rollers, with the small diameter end of each roller facing the adjacent ring of rollers.

* * * * *